United States Patent [19]

Nakagama et al.

[11] Patent Number: 5,172,159
[45] Date of Patent: Dec. 15, 1992

[54] COPYING APPARATUS WITH COOLING DEVICE

[75] Inventors: Kiyohari Nakagama; Satoshi Watanabe, both of Hachioji, Japan

[73] Assignee: Konica Corporation, Tokyo, Japan

[21] Appl. No.: 819,873

[22] Filed: Jan. 13, 1992

[30] Foreign Application Priority Data

Jan. 23, 1991 [JP] Japan ................................ 3-006497
Jan. 23, 1991 [JP] Japan ................................ 3-006498
Jan. 23, 1991 [JP] Japan ................................ 3-006499

[51] Int. Cl.⁵ ............................................. G03B 27/52
[52] U.S. Cl. ................................................. 355/30
[58] Field of Search ........................... 355/30, 228, 77

[56] References Cited

FOREIGN PATENT DOCUMENTS 64-10752 1/1989 Japan.

Primary Examiner—Richard A. Wintercorn
Attorney, Agent, or Firm—Frishauf, Holtz, Goodman & Woodward

[57] ABSTRACT

In a copying apparatus provided with a platen glass located on the top of the apparatus, an exposure lamp moves under the platen glass in parallel with it for illuminating a document on the platen glass, mirrors move concurrently with the exposure lamp for illuminating an image carrier, and a cooling fan is positioned laterally to the moving paths of the exposure lamp and the mirrors for cooling the platen glass. The cooling fan is operated some time after the start of a copying operation, in accordance with light amount of the exposure lamp, the number of copies to be made, the document size, the image magnification, or by a combination of these factors.

8 Claims, 8 Drawing Sheets

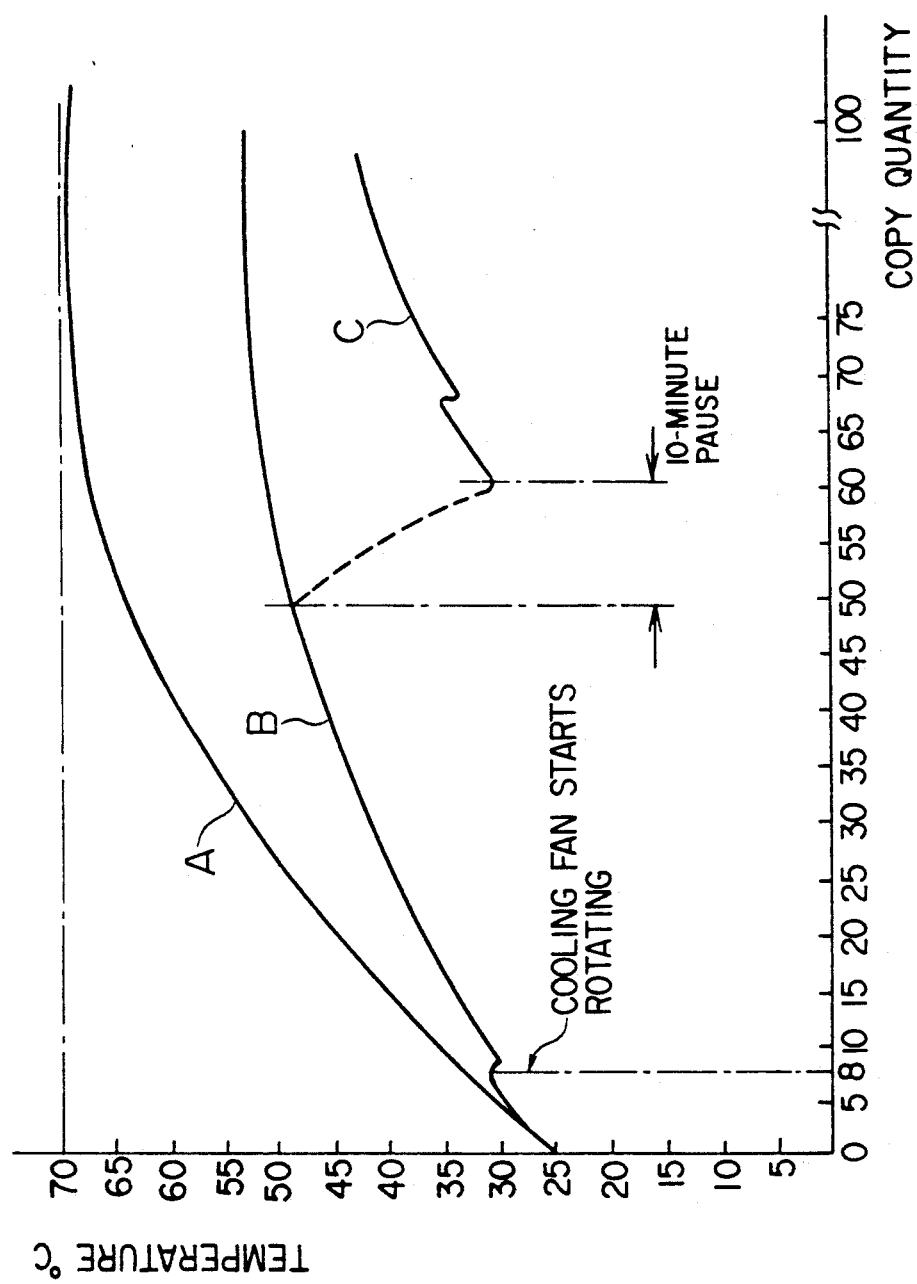

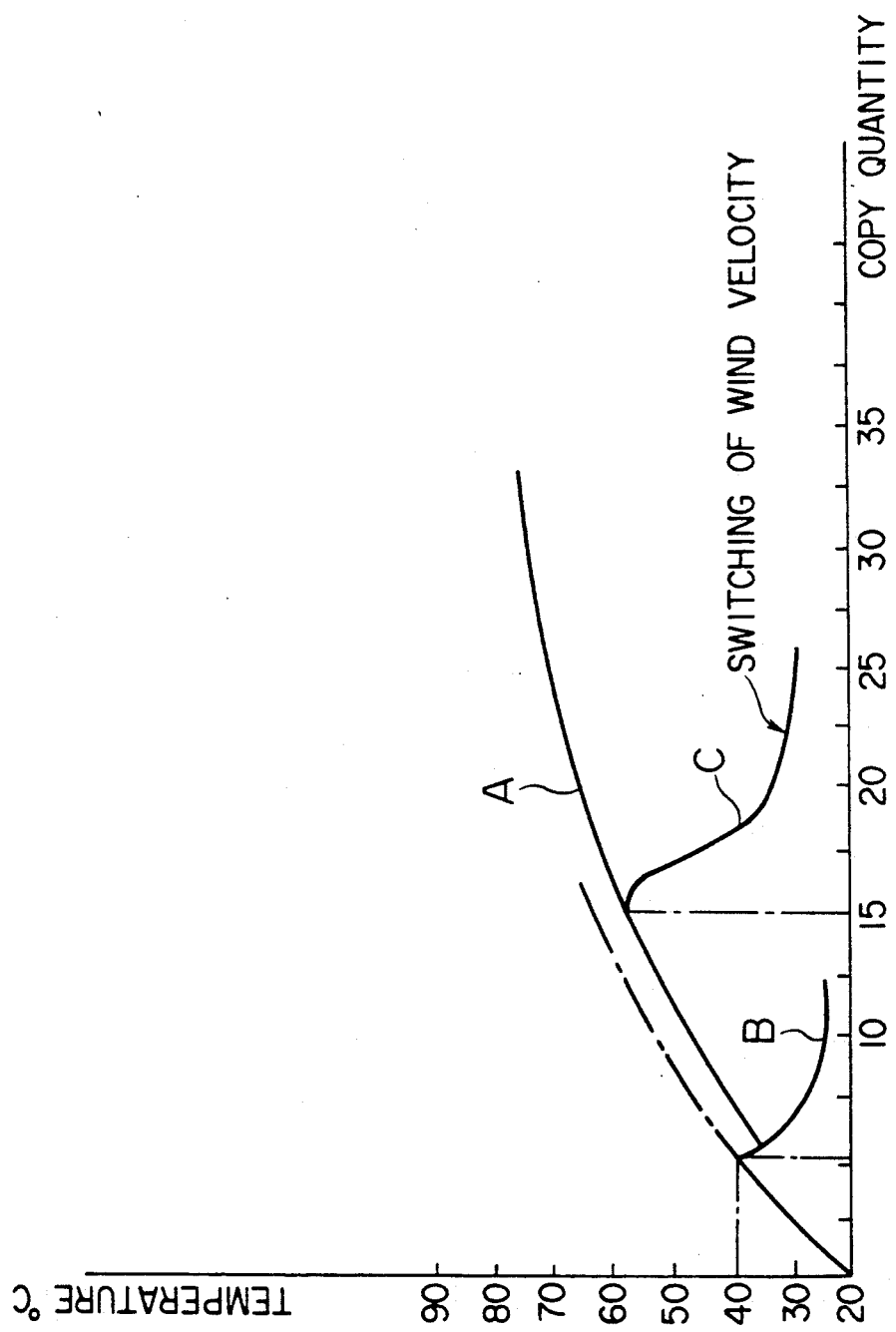

COPYING APPARATUS WITH COOLING DEVICE

BACKGROUND OF THE INVENTION

The present invention relates to a document exposure unit with which a copying apparatus is equipped, and more particularly to a document exposure unit wherein, for the purpose of preventing a platen glass from being overheated excessively through illumination by an exposure lamp, a cooling fan for preventing overheating is caused to start running after a certain period of time from the start of copying and thereby the cooling fan is operated most efficiently in terms of operation time or it is operated efficiently through judgment of operation conditions in the copying apparatus, and thus an optical system including a platen glass is prevented from being soiled with dust in the air or with toner.

In general, a powerful light source is used in a copying apparatus for the exposure of a document, and a light source with an intensity of light as high as several hundred watts is usually used. After making several hundred copies, therefore, the temperature of the platen glass on which a document is placed goes up sharply as shown by curve A in FIG. 4, reaching around 70° C., which causes the problem that it is difficult for an operator to place a document on the platen glass and that the platen glass tends to be broken due to its high temperature. For preventing such problems, there has been known a method to prevent the temperature rise on a platen glass by reducing the copy speed. In this method, however, copying efficiency is lowered. In order to improve copying efficiency, therefore, there has been used a method to cool the bottom surface of the platen glass forcibly, in which a method to cool with a fan is most economical and efficient in general. However, when a fan is caused to continue running during copying operations regardless of the temperature of the platen glass, toner, especially black toner used generally scattered from a developing unit provided in a copying apparatus is sucked by the fan and adheres to the bottom surface of the platen glass and to the reflection mirrors used in an optical system. With an increase in copying operations, therefore, even when the surface of a document is exposed to an exposure lamp, clear and sharp copy images can not be obtained due to an insufficient amount of light. In a method disclosed in Japanese Utility Model Publication Open to Public Inspection No. 10752/1989 (hereinafter referred to as Japanese Utility Model O.P.I. Publication) as a means for solving such a problem, the temperature on the surface of a platen glass is measured by a detecting device during continuing copying operations, and when the temperature exceeds a certain level, a fan for cooling is operated. This method, however, requires a detecting device for the temperature, resulting in a complicated structure and high cost of the apparatus.

Since a fan employs a motor generally, it is possible to rotate it at high speed by boosting voltage or increasing a current to rapidly cool a platen glass, an exposure lamp and optical mirrors. In that case, however, the aforementioned suction of toners is increased and consequently, scattered toners are strongly blown against the platen glass, the exposure lamp and the optical mirrors, resulting in contamination of the optical mirrors and an insufficient amount of light from the exposure lamp for practical use. When a fan is rotated at low speed, on the contrary, the cooling effect is lowered accordingly. One way for coping with this is to lower the copying speed. This method, however, reduces the function of a copying apparatus. As described above, it is very difficult to control the rotation of a cooling fan, and the temperature rise varies complicatedly depending upon the mode of copying operations, such as sheet size, magnification change and the number of copies. In a conventional method in the past, the cooling fan has been constantly operated during copying operations without coping with variation in temperature rise mentioned above, resulting in the platen glass and mirrors both becoming contaminated with toner and dust, and in inefficient cooling.

SUMMARY OF THE INVENTION

In the first embodiment of the invention in order to solve the problems described above, a copying apparatus equipped with a cooling unit for cooling a platen is provided with a platen glass located on the top of the copying apparatus, an exposure lamp that moves under the platen glass in parallel with it for illuminating a document on the aforementioned platen glass, a plurality of reflection mirrors which move concurrently with the aforementioned exposure lamp for illuminating an image carrier, and with a cooling fan that is positioned on the side of a moving path of the aforementioned exposure lamp and plural reflection mirrors for cooling the aforementioned platen glass, and the cooling fan is operated after a certain period of time from the start of copying operation.

In the second embodiment of the invention, a copying apparatus equipped with a cooling unit for cooling a platen is provided with a platen glass located on the top of the copying apparatus, an exposure lamp that moves under the platen glass in parallel with it for illuminating a document on the aforementioned platen glass, a plurality of reflection mirrors which move concurrently with the aforementioned exposure lamp for illuminating an image carrier, a cooling fan that is positioned on the side of a moving path of the aforementioned exposure lamp and plural reflection mirrors for cooling the aforementioned platen glass, a means for setting the copy quantity with which the copy quantity is set, and with a control means whereby a driving means for the cooling fan is controlled by the aforementioned means for setting the copy quantity.

In the third embodiment of the invention, a copying apparatus equipped with a cooling unit for cooling a platen is provided with a platen glass located on the top of the copying apparatus, an exposure lamp that moves under the platen glass in parallel with it for illuminating a document on the aforementioned platen glass, a plurality of reflection mirrors which move concurrently with the aforementioned exposure lamp for illuminating an image carrier, a cooling fan that is positioned on the side of a moving path of the aforementioned exposure lamp and plural reflection mirrors for cooling the aforementioned platen glass, an optical system that forms an image of a document illuminated by the aforementioned exposure lamp on the surface of the aforementioned image carrier through the aforementioned reflection mirrors, a magnification changing means for changing the magnification by moving the optical system mentioned above, and with a switching means for changing the size of recording sheets, and thereby, the conditions for driving the aforementioned cooling fan are controlled by the factors such as the amount of light of the aforementioned exposure lamp, the copy quantity, the size of recording sheets, magnification and/or a combination of the factors when the aforementioned copying apparatus has counted the copy quantity and output signals telling that the predetermined number of copies is exceeded have been outputted.

DETAILED DESCRIPTION OF THE PREFERRED EMBODIMENTS

Figure 3:
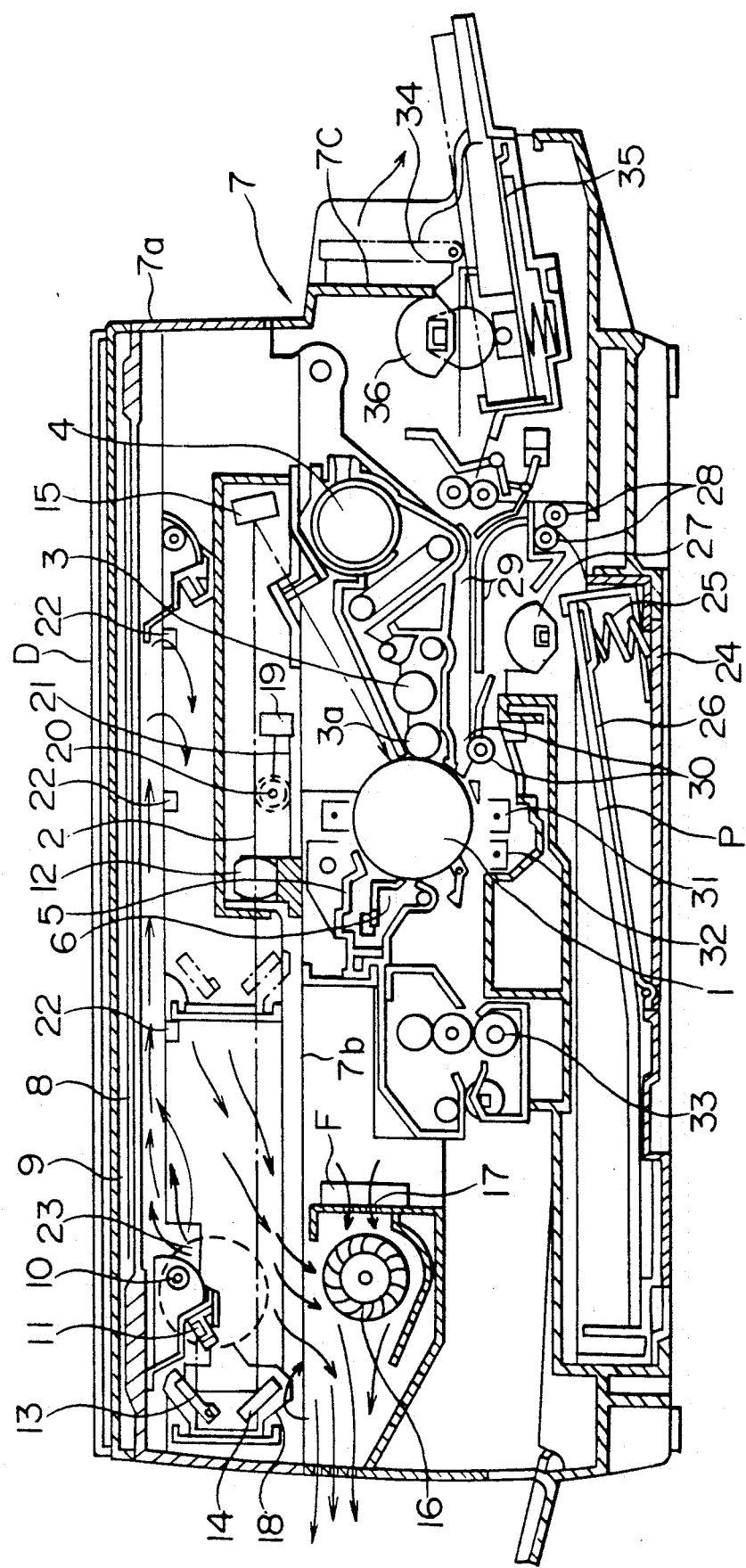
FIG. 3 is a cross-sectional view showing a copying apparatus to which the invention is applied, and FIGS. 4(A), (B) and (C) represent illustration for operation showing the operation of the cooling fan.

FIG. 3 is a structural diagram of an entire copying apparatus, wherein the numeral 1 represents a photoreceptor drum, 2 is a charging electrode that gives electric charges at a certain level on the entire surface of the photoreceptor drum 1, the numeral 3 is a developing unit equipped with toner replenishing portion 4, and the numeral 5 is a cleaning unit equipped with cleaning blade 6 that removes residual toners from the photoreceptor drum 1, and the items mentioned above are solidly united to be a unit which is mounted detachably on upper frame body 7a of copying apparatus 7. On the upper frame body 8, there are further provided platen glass 8 on which a document is placed, platen cover 9 which holds document D with pressure when the document D is placed on the platen 8, exposure lamp 10 which travels to the position shown respectively with chain lines, being guided by a guide rail (not shown) under the platen glass 8 in the upper frame body 7a mentioned above, first reflection mirror 11 that travels together with the exposure lamp 10, V-shaped mirrors 13 and 14 which are in one united body and receive light from the first reflection mirror 11 to reflect it to focusing lens 12, and stationary mirror 15 that illuminates the aforementioned photoreceptor drum 1 for forming electrostatic latent images. The numeral 16 is an exhaust fan that exhausts heat generated in the copying apparatus. The exhaust fan 16 is equipped with inlet ports 17 and 18, and toner scattered from a developing unit and ozone generated from the charging electrode 2 are exhausted through the inlet port 17. Through the inlet port 18 formed on light-shielding plate 7b that is for shielding the optical system against light, on the other hand, heat generated from the exposure lamp 10 in the upper optical system is exhausted. Incidentally, the length of an optical path between the document and the surface of the photoreceptor drum 1 is always kept constant by moving the V-shaped mirrors 13 and 14 through the guide rail for a distance which is one half that of the movement of the exposure lamp 10. The numeral 19 is a drive source for moving the aforementioned focusing lens 12 for copying in a changed magnification, and it moves the focusing lens 12 to the proper position corresponding to the changed magnification by means of pinion 20 and rack 21. The numeral 22 represents sensors for changing the distance of movement of the exposure lamp 10 depending on the width of a document, and a plurality of them are provided at plural locations along the moving path of the exposure lamp 10 so that the movement distance may be changed depending on the sheet size (substantially, the size of a recording sheet).

The numeral 23 is a cooling fan for cooling the platen glass 8, and it is provided on the side of the frame body. It will be explained in detail later, referring to FIG. 1.

The numeral 24 is a sheet-feeding cassette that is provided under lower frame body 7c of the copying apparatus 7 for storing therein recording sheets P. The leading edge portion in terms of sheet-feeding direction of a stack of recording sheets P in the sheet-feeding cassette 24 is pushed up by spring 25 through pressure plate 26, and topmost recording sheet P is fed out by semicircular sheet-feeding roller 27 and is transported to second sheet-feeding rollers 30 through transport rollers 28 and guide member 29. The second sheet-feeding rollers 30 operate so that the recording sheet P suspended at the second sheet-feeding rollers 30 for a while may be synchronized with toner images developed by the developing unit 3 on the surface of the photoreceptor drum 1. The numeral 31 is a transfer electrode for transferring toner images formed on the surface of the photoreceptor drum 1 onto the recording sheet P, the numeral 32 is a separation electrode for separating the recording sheet P from the surface of the photoreceptor drum 1, and the numeral 33 is a fixing unit for fixing toner images transferred onto the recording sheet P. On the lower frame body 7c, there are provided manual feeding device 34 for feeding a single sheet and manual feeding device 35 for feeding multiple sheets, and from each of them, a sheet is fed out by semicircular sheet-feeding roller 36.

Figure 1:
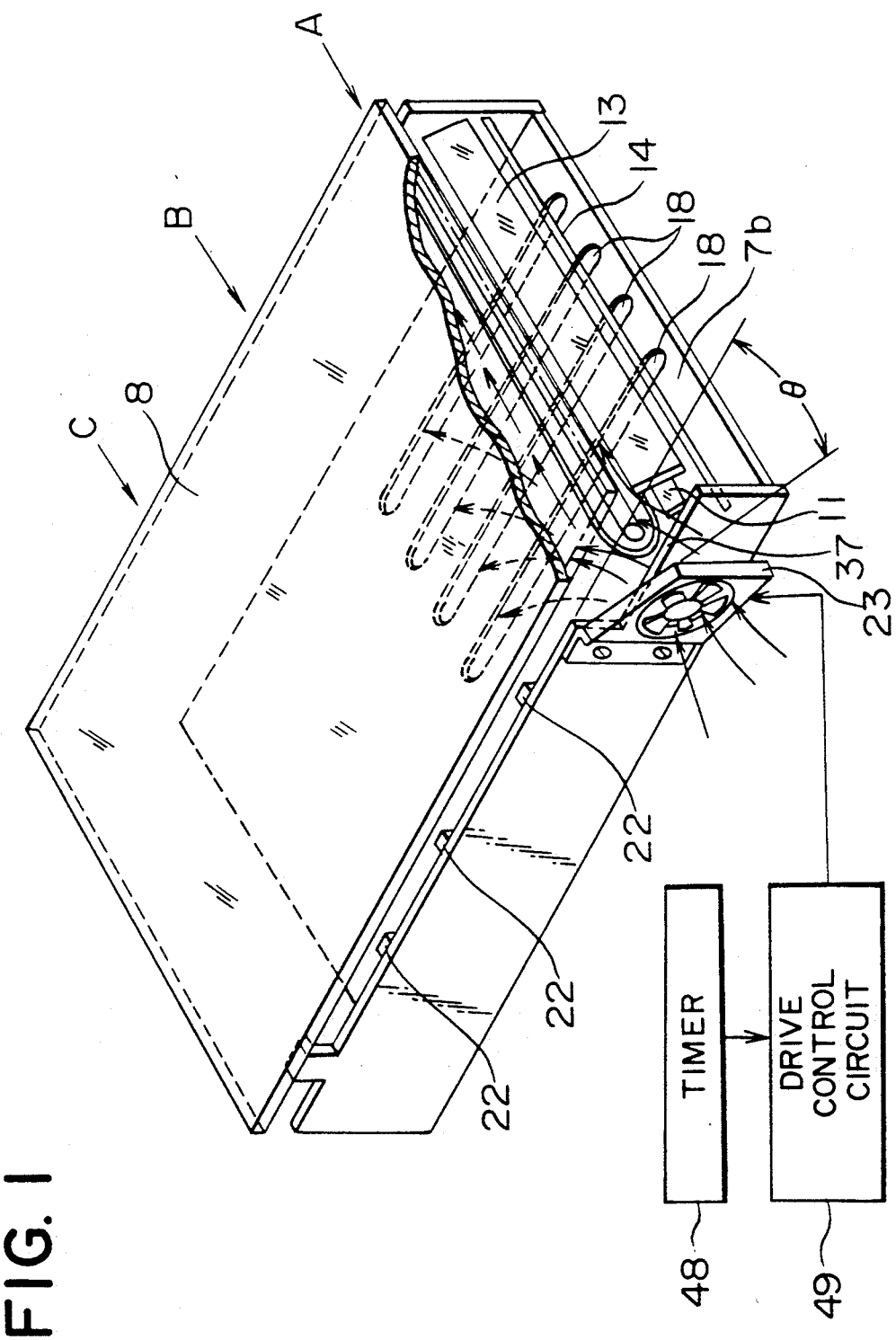
FIG. 1 is a perspective view showing how a cooling fan of the invention is arranged.

FIG. 1 will be explained, next. FIG. 1 is a drawing showing a part of cooling fan 23 for the platen glass 8 shown in FIG. 3, and the cooling fan 23 is mounted aslant at an angle of $\theta$ with the upper frame body 7a as illustrated. The portion that is blown most fiercely by the wind from the cooling fan 23 is the one shown with arrow A where the exposure lamp 10 and V-shaped mirrors 13 and 14 are staying in FIG. 1, and the portion shown with arrow B is blown moderately and the portion with arrow C is blown most gently. On the upper frame body 7a, there is formed cut-out 37 so that the wind from the cooling fan 23 may enter effectively.

Figure 2:
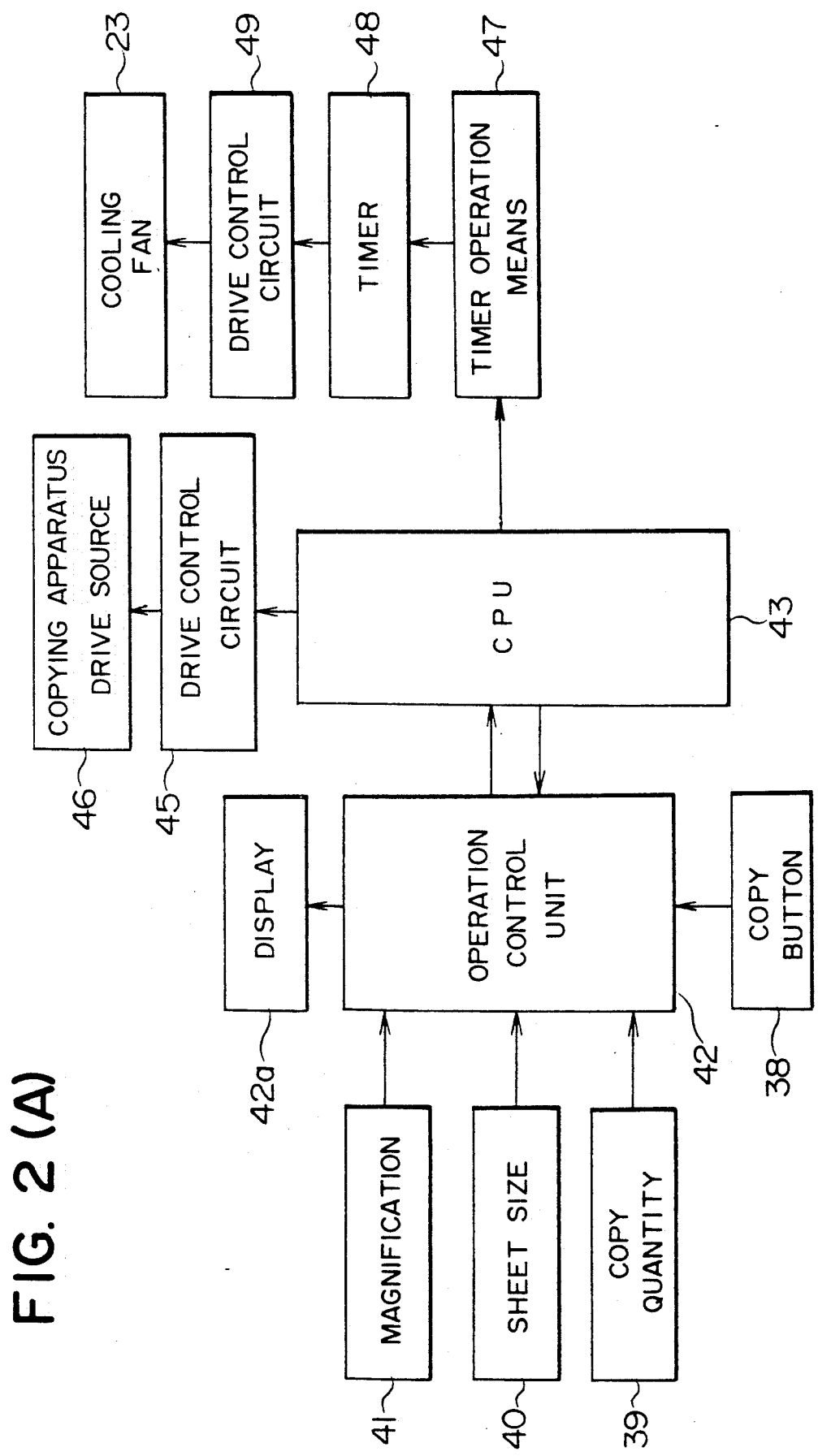
FIGS. 2(A), 2(B) and 2(C) represent block diagrams of control circuits.
Figure 2B:
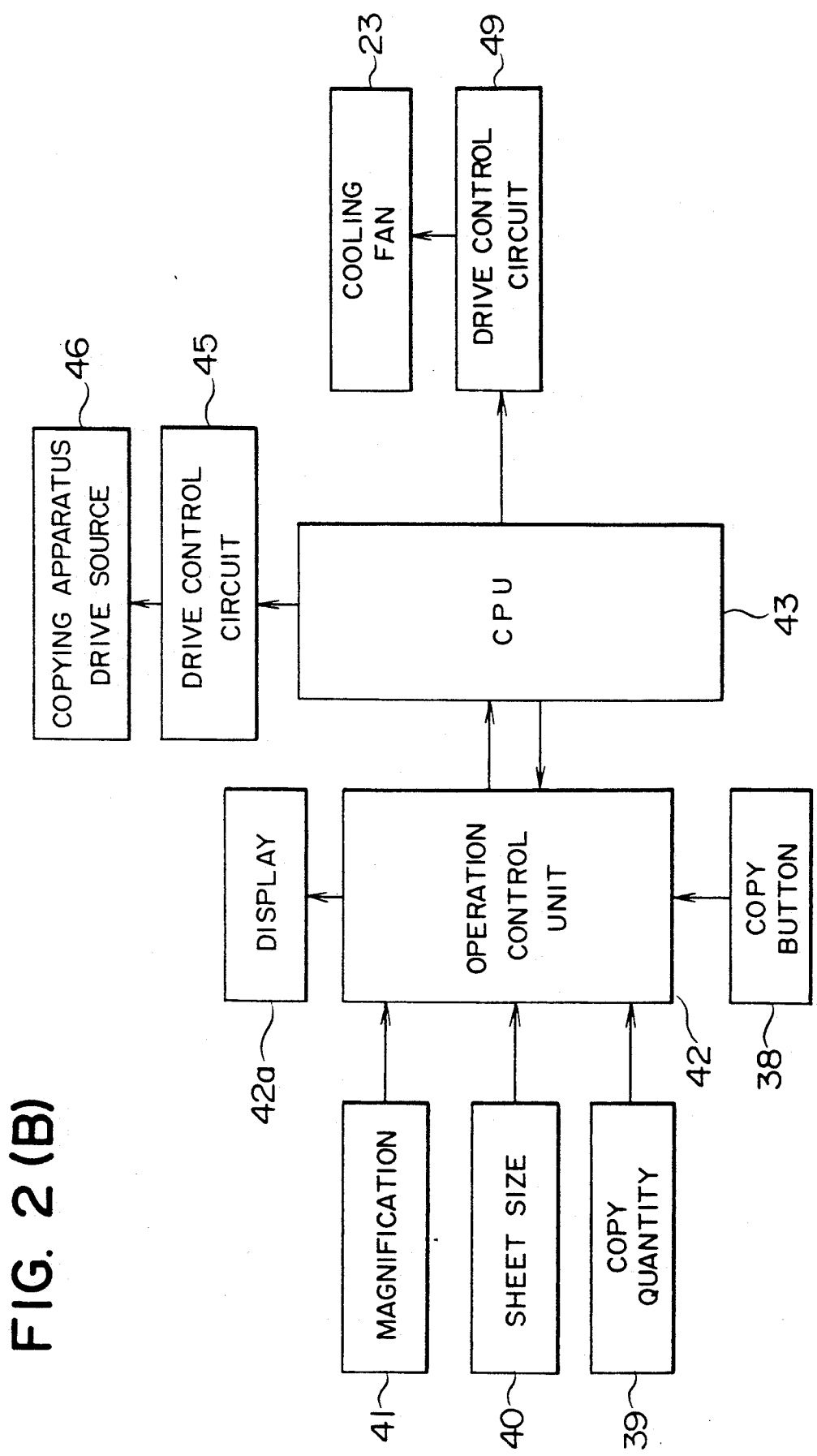
Figure 2:
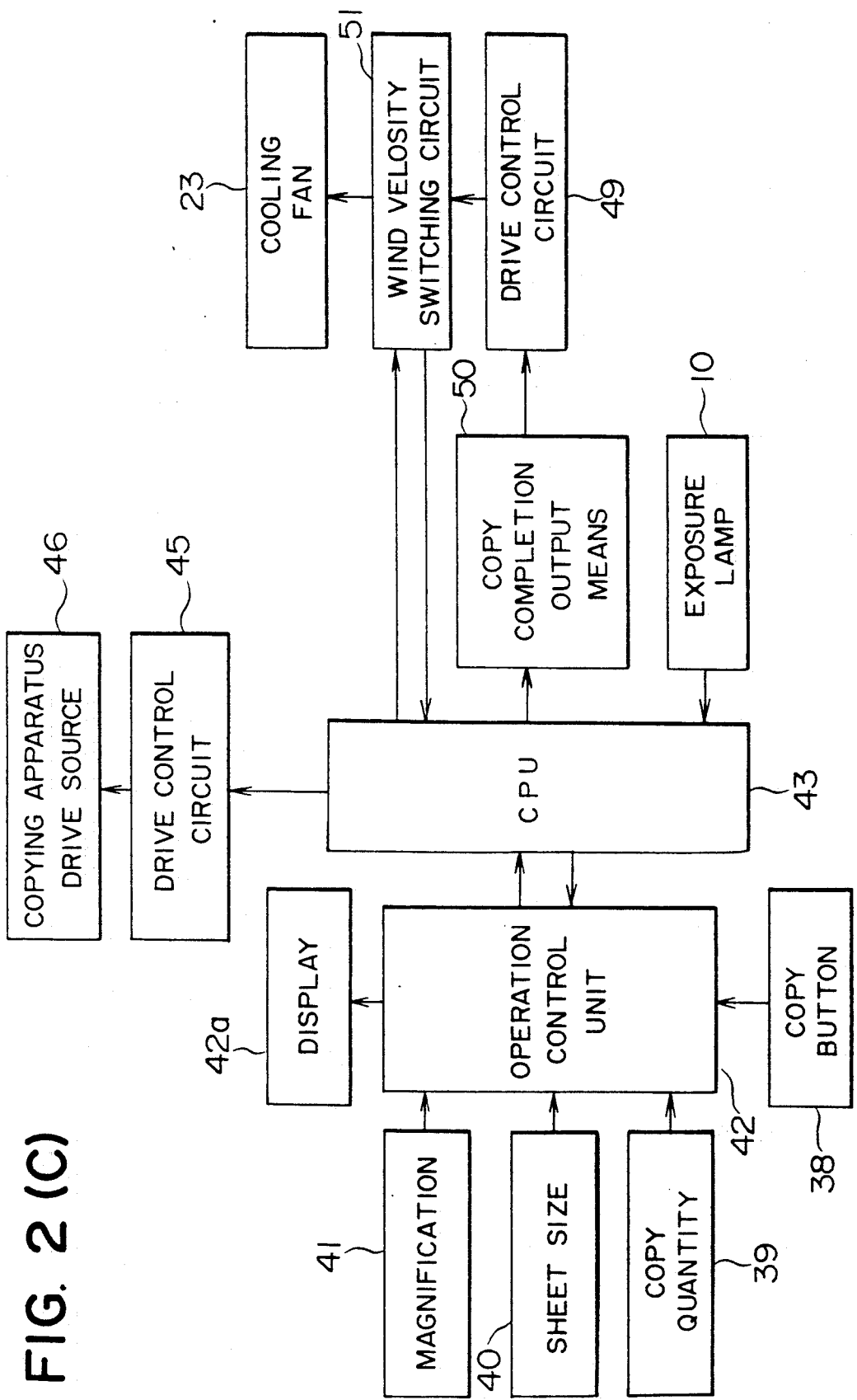

FIG. 2 (A) showing a first example of the invention includes copy button 38 that is for starting copying, copy quantity button 39 that is for setting the copy quantity, sheet size button 40 that is for switching sheet sizes, magnification button 41 for switching magnification and display 42a on which a display is made by means of liquid crystal or other display means through operation control unit 42 that receives signals sent from each button. The numeral 45 is a drive control circuit that operates drive source 45 for the copying apparatus 7.

The numeral 47 is a timer operation means that starts copying operation and actuates timer 48, and it is connected to CPU 43. The numeral 49 is a drive control circuit that receives from the timer 48 the signals for starting the operation of the cooling fan 23 and operates. Incidentally, the timer 48 starts operating concurrently with the start of copying, but programs are inputted so that the timer 48 may send no signal to the drive control circuit for about 60 sec that is equivalent to the period of time required for making 1-6 copies.

Figure 4:
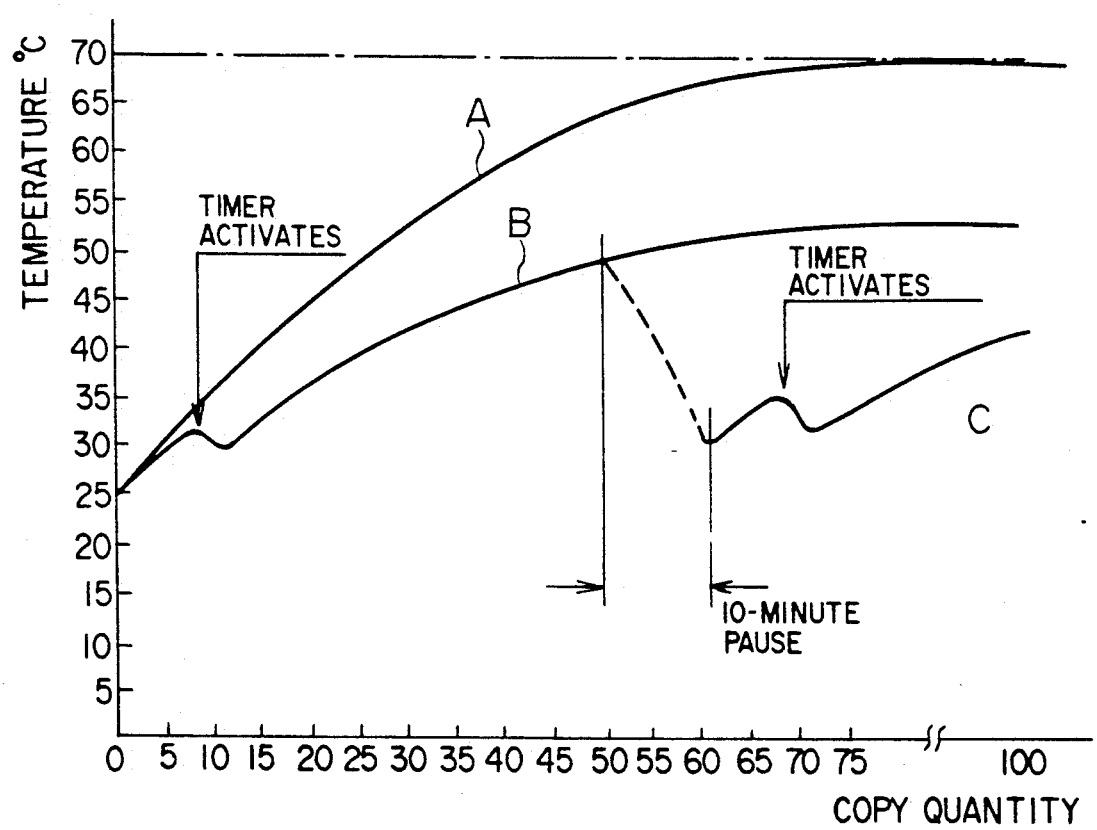

The invention is constituted as stated above, and when a switch (not shown) of copying apparatus 7 is turned on, power is usually supplied to each unit of the copying apparatus 7 concurrently, and an exhaust fan is constantly driven to rotate for lowering the temperature inside the apparatus, because fixing unit 33 is kept at a constant fixing temperature, thus, the temperature in the apparatus is kept at an optimum temperature of about 25° C. as shown in FIG. 4 (A). Copy quantity button 39 shown in FIG. 2 (A) is not operated for copying of a single sheet, and when copy button 38 for the start of copying is operated, signals sent from operation control unit 42 operate drive control circuit 45 through CPU 43 and further drive the drive source 46 for the entire copying apparatus 7. Concurrently with the start of copying, copy start signals inputted in the operation control unit 42 are outputted to CPU 43 from which the copy start signals are further outputted to timer operation means 47, thus timer 48 starts operating. Concurrently with the start of copying, the surfaces of documents D placed on platen glass 8 are exposed to exposure lamp 10 in succession. Reflected light from the surface of the document D is reflected successively on the first reflection mirror 11 and the V-shaped mirrors 13 and 14, and finally reflected on the stationary mirror 15 after passing through the focusing lens 12, thus, the reflected light is projected on the surface of the photoreceptor drum 1. The surface of the photoreceptor drum 1 is electrically charged by charging electrode 2 in advance, and consequently, electrostatic latent images are formed on the surface of the photoreceptor drum 1 by the aforementioned exposure. Then the electrostatic latent images are developed by rotating developing sleeve 3a equipped on developing unit 3 to be toner images. Between the surface of the photoreceptor drum 1 and the developing unit 3 in that case, there is provided a clearance necessary for the rotation of the developing sleeve 3a. Therefore, slight toner scattering can not be avoided. Since the toner is usually composed of very fine particles, once they are scattered, they float inside the copying apparatus 7. Therefore, toner contamination inside the apparatus is caused, and for avoiding it, the exhaust fan 16 is operated for running constantly so that toner is sucked through the inlet port 17.

On the other hand, part of the scattered toner arrives and is staying in the neighborhood of the first reflection mirror 11 and V-shaped mirrors 13 and 14 which constitute the aforementioned optical system, and when a document on the platen glass 8 is exposed to the exposure lamp 10, a high intensity lamp such as a 250-watt lamp or so is used as the exposure lamp 10 for image forming. Therefore, a great amount of heat is generated as shown by curve A in FIG. 4 (A), especially in the case of continuous copying.

As described above, exhaust fan 16 is equipped with inlet port 18 on the optical system side to exhaust heated air together with toner. However, such means is not capable of cooling sufficiently. In the past, therefore, cooling fan 23 has been started operating concurrently with the start of copying operations for preventing the temperature rise shown by curve A. In the invention, since the platen glass 8 and other optical systems such as V-shaped mirrors 13 and 14 are not at high a temperature if the copy quantity is 1–6 copies. Therefore, even when the timer 48 starts operating, the timer operation means 47 outputs signals for stopping timer 48 if copy signals of completion of 1–6 copies are received from CPU 43 and thus the timer 48 stops operating. Therefore, signals are not outputted to drive control circuit 49 and cooling fan 23 does not operate, resulting in no cooling. However, when the copying operation continues to exceed the copy quantity of 6 copies, and the timer operation means 47 does not output signals for suspending the timer 48, the timer 48 continues operating and after a period of time, 60 sec for example, programmed in the timer 48 has passed, input signals are automatically sent from the timer 48 to drive control circuit 49 for starting the cooling fan 23. After the start of the cooling fan, the temperature of the platen glass 8 is lowered as shown by curve B in FIG. 4 (A).

However, when the copying operation continues, the temperature of the platen glass 8 rises gradually as shown by curve B which, however, is lower in terms of temperature than that obtained when the cooling fan 23 is not used, and the temperature does not rise up to one which makes operation impossible. The temperature of the platen glass 8 goes down sharply after the completion of copying, for example, it falls from 45° C. that corresponds to completion of 50 copies down to 25° C. within about 10 minutes as shown in FIG. 2 (A). Curve C represents a temperature curve obtained after further copying is started, and when copying of 6 copies or more is continued, the cooling fan 23 is operated.

Since the cooling fan 23 is affixed aslant on the upper frame body 7a at an angle of $\theta$ with the upper frame body as shown in FIG. 1, cold air blows fiercely the portion where the exposure lamp 10 and the V-shaped mirrors 13 and 14 come to a stop. Therefore, it is possible to lower the temperature around the platen glass 8 in the stop position where the temperature rise is especially high.

Although explanation has been made thus far about cooling through timer 48 only in terms of a period of time from the start of copying in the invention, there are many copying apparatuses wherein the distance of movement of the exposure lamp 10 is automatically changed by the operation of switching the sheet size to B5 size or to A3 size, when signals are inputted from any of copy quantity button 39, sheet size button 40 and magnification-changing button 41, for example, when signals from the sheet size button 40 are inputted as shown in FIG. 2 (A). As shown in FIG. 3, owing to plural sensors 22 which determine the distance of movement of the exposure lamp 10 depending upon the sheet size, the exposure lamp 10 stops depending on the sheet size, and goes out for returning. For example, in the case of B5 size, the distance of movement against the platen glass 8 is short and in the case of A3 size, the entire surface of the platen glass 8 is required to be illuminated and the distance of movement is long, though the copy quantity is not 100. Namely, when the distance of movement is short, the amount of energy received during the unit time is great.

Further, when magnification-changing button 41 provided on the copying apparatus 7 is used, the moving speed for the enlargement copying is different from that for reduction copying. In the case of enlargement copying, the moving speed of the exposure lamp 10 is slow, while in the case of reduction copying, the moving speed of the exposure lamp 10 is fast. In the case of enlargement copying, the neighborhood of both the platen glass 8 and the exposure lamp 10 is naturally overheated despite copying for making scores of copies, and is required to be cooled down by the cooling fan 23. In the case of reduction copying, on the other hand, the moving speed of the exposure lamp 10 is high. Compared with an occasion of the enlargement copying, therefore, saturation of overheating is more delayed.

Setting time for the timer may be automatically determined by the information mentioned above. When the illumination time of the exposure lamp 10 is increased, the cooling fan 23 may be set to start operating earlier and thereby preventing the platen glass 8 from being overheated. It is also possible to control the cooling fan by counting the copy quantity, without using the timer.

FIG. 2 (B) showing the second example of the invention includes copy button 38 which starts the copying operation of the copying apparatus 7, copy quantity button 39 for setting the copy quantity, sheet size button 40 for switching the sheet sizes, magnification button 41 for changing the magnification, and display 42a which indicates information by means of liquid crystal or other display means through operation control unit 42 that receives signals sent from the aforementioned buttons. In the figure, the drive control circuit 49 is operated through input or output conducted between the aforementioned operation control unit 42 and CPU 43 and thus, the cooling fan for the optical system is turned on or turned off. The numeral 45 is a drive control circuit that operates drive source 46 of the copying apparatus 7.

The present example is constituted as described above, and when a switch (not shown) of copying apparatus 7 is turned on, power is usually supplied to each unit of the copying apparatus 7 concurrently, and an exhaust fan is constantly driven to rotate to lower the temperature inside the apparatus because fixing unit 33 is kept at a constant fixing temperature, thus, the temperature in the apparatus is kept at an optimum temperature of about 25° C. as shown in FIG. 4 (B). Copy quantity button 39 shown in FIG. 2 (B) is not operated for copying of a single sheet, and when copy button 38 for the start of copying is operated, signals sent from operation control unit 42 operate drive control circuit 45 through CPU 43 and further drive the drive source 46 for the total copying apparatus 7. Concurrently with the start of copying, the surface of document D placed on platen glass 8 is exposed to exposure lamp 10 in succession. Reflected light from the surface of the document is reflected successively on the first reflection mirror 11 and the V-shaped mirrors 13 and 14, and finally reflected on the stationary mirror 15 after passing through the focusing lens 12, thus, the reflected light is projected on the surface of the photoreceptor drum 1. The surface of the photoreceptor drum 1 is electrically charged by charging electrode 2 in advance, and consequently, electrostatic latent images are formed on the surface of the photoreceptor drum 1 by the aforementioned exposure. Then the electrostatic latent images are developed by rotating developing sleeve 3a equipped on developing unit 3 to be toner images. Between the surface of the photoreceptor drum 1 and the developing unit 3 in that case, there is provided a clearance necessary for the rotation of the developing sleeve 3a. Therefore, slight toner scattering can not be avoided. Since the toner is usually composed of very fine particles, once they are scattered, they float inside the copying apparatus 7. Therefore, toner contamination inside the apparatus is caused, and for avoiding it, the exhaust fan 16 is operated for running constantly so that toners are sucked through the inlet port 17.

On the other hand, part of the scattered toner arrives and is staying in the neighborhood of the first reflection mirror 11 and V-shaped mirrors 13 and 14 which constitute the aforementioned optical system, and when a document on the platen glass 8 is exposed to the exposure lamp 10, a high intensity lamp such as an 250-watt lamp or so is used as the exposure lamp 10 for image forming. Therefore, a great amount of heat is generated as shown in FIG. 4 (B), especially in the case of continuous copying.

As described above, exhaust fan 16 is equipped with inlet port 18 on the optical system side to exhaust heated air together with toner. However, such means is not capable of cooling sufficiently. In the past, therefore, cooling fan 23 has been started operating concurrently with the start of the copying operation for preventing the temperature rise. However, a high temperature rise does not take place when copying 1–6 copies, and it is not necessary to operate the cooling fan 23 according to curve B in FIG. 4 (B). As shown in FIG. 2 (B), the copy operation is started by pressing copy button 38 for starting copying and by causing CPU 43 to operate with signals sent to operation control unit 42. Copy quantity signals from copy quantity button 39 are inputted in operation control unit 42 and then are sent to CPU 43, and when the copy quantity is 5–6 copies, the CPU does not send signals to drive control circuit 49 and thereby drive control circuit does not operate, thus the cooling fan 23 for the optical system is controlled not to operate. On the other hand, only when continuous copying for 8 copies or more is made through inputting by means of the aforementioned copy quantity button 39, the CPU 43 sends signals to operate the drive control circuit 49 and thereby to operate the cooling fan 23. Thus, the cooling fan blows cold air, focusing on the exposure lamp 10 that is the heat-generating source and V-shaped mirrors 13 and 14, and also blows cold air to the reverse side of the platen glass 8 as shown with an arrow, to bring the temperature down to a safe temperature.

Since the cooling fan 23 is affixed aslant on the upper frame body 7a at an angle of θ with the upper frame body as shown in FIG. 1, cold air blows fiercely the portion where the exposure lamp 10 and the V-shaped mirrors 13 and 14 come to a stop. Therefore, it is possible to lower the temperature around the platen glass 8 in the stop position where the temperature rise is especially high.

As shown in FIG. 4 (B), the temperature inside the copying apparatus falls down to about 25° C. after the suspension of copy operation for about 10 minutes, and it follows a temperature curve like curve C again after resumption of copy operations.

There are many copying apparatuses wherein the distance of movement of the exposure lamp 10 is automatically changed by the operation of switching the sheet size to B5 size or to A3 size, as shown in FIG. 3, owing to plural sensors 22 which determine the distance of movement of the exposure lamp 10 depending upon the sheet size, the exposure lamp 10 stops, depending on the sheet size, and goes out for returning. For example, in the case of B5 size, the distance of movement against the platen glass 8 is short and thereby the number of illumination is large, and in the case of A3 size, the entire surface of the platen glass 8 is required to be illuminated and the number of illumination is small, when several hundreds of copies are made. By sending the signals of such information of sheet sizes from CPU 43 to drive control circuit 49 through operation control unit 42 as shown in FIG. 2 (B), it is possible to control the rotation of the cooling fan 23 and thereby to prevent overheating and to avoid unnecessary rotation of the cooling fan 23.

Further, when magnification-changing means (hereinafter referred to as magnification) for an optical system provided on the copying apparatus 7 is used, the moving speed for enlargement copying is different from that for reduction copying. In the case of enlargement copying, the moving speed of the exposure lamp 10 is slow, while in the case of reduction copying, the moving speed of the exposure lamp 10 is high. In the case of enlargement copying, the neighborhood of both the platen glass 8 and the exposure lamp 10 is naturally overheated despite copying for scores of copies, and is required to be cooled down by the cooling fan 23. In the case of reduction copying, on the other hand, the moving speed of the exposure lamp 10 is high. Compared with an occasion of the reduction copying, therefore, overheating is more delayed. As shown in FIG. 2 (B), magnification information is inputted in operation control unit 42 from magnification button 41, and CPU 43 controls drive control circuit 49 to be on or off for controlling the rotation of the cooling fan 23, thus, unnecessary rotation of the cooling fan 23 can be avoided.

In the invention, it is also possible to control the cooling fan 23 by means of supply voltage (CVR) which is related to the platen glass 8. The cooling fan 23 may further be controlled by outputting from CPU 43 the total combination of copy quantity, sheet size, magnification and supply voltage (CVR).

FIG. 3 (C) showing the third example of the invention includes copy button 38 which starts copying, copy quantity button 39 for setting the copy quantity, sheet size button 40 for switching the sheet sizes, magnification button 41 for changing the magnification, and display 42a which indicates by means of liquid crystal or other display means through operation control unit 42 that receives signals sent from each button, and in the figure, the drive control circuit 44 is operated through input or output between the aforementioned operation control unit 42 and CPU 43 and thus, the cooling fan for the optical system is turned on or turned off. The numeral 45 is a drive control circuit that operates drive source 46 for the copying apparatus 7.

The numeral 50 is a copy completion output means. CPU 43 receives information that copy button 38 has been pressed, copying apparatus 7 has started its copy operation, images have been formed on recording sheet P, and the recording sheet P has left fixing unit 33 to be ejected, and then the CPU 43 outputs information that the copy operation has been completed to the copy completion output means 50. The cooling fan 23 is caused by the drive control circuit 49 to operate for a certain period of time from the moment when the copy completion output means 50 has received the aforementioned information.

The numeral 51 is a wind speed switching circuit that changes the speed of revolution of the cooling fan 23 for a strong wind and a breeze.

The present example is constituted as described above, and when a switch (not shown) of copying apparatus 7 is turned on, power is usually supplied to each unit of the copying apparatus 7 concurrently, and an exhaust fan is constantly driven for rotation for lowering the temperature inside the apparatus because fixing unit 33 is kept at a constant fixing temperature, thus, the temperature in the apparatus is kept at an optimum temperature of about 25° C. as shown in FIG. 4 (C). Copy quantity button 39 shown in FIG. 2 (C) is not operated for copying of a single sheet, and when copy button 38 for the start copying is operated, signals sent from operation control unit 42 operate drive control circuit 45 through CPU 43 and further drive the drive source 46 for the total copying apparatus 7. Concurrently with the start of copying made by pressing copy button 38, the surface of document D placed on platen glass 8 is exposed to exposure lamp 10 in succession. Reflected light from the surface of the document is reflected successively on the first reflection mirror 11 and the V-shaped mirrors 13 and 14, and finally reflected on the stationary mirror 15 after passing through the focusing lens 12, thus, the reflected light is projected on the surface of the photoreceptor drum 1. The surface of the photoreceptor drum 1 is electrically charged by charging electrode 2 in advance, and consequently, electrostatic latent images are formed on the surface of the photoreceptor drum 1 by the aforementioned exposure. Then the electrostatic latent images are developed by rotating developing sleeve 3a equipped on developing unit 3 to be toner images. Between the surface of the photoreceptor drum 1 and the developing unit 3 in that case, there is provided a clearance necessary for the rotation of the developing sleeve 3a. Therefore, slight toner scattering can not be avoided.

Since the toner is usually composed of very fine particles, once they are scattered, they float inside the copying apparatus 7. Therefore, toner contamination inside the apparatus is caused, and to avoid it, the exhaust fan 16 is operated to run constantly so that toner is sucked through the inlet port 17.

On the other hand, part of scattered toner arrives and stays in the neighborhood of the first reflection mirror 11 and V-shaped mirrors 13 and 14 which constitute the aforementioned optical system, and when a document on the platen glass 8 is exposed to the exposure lamp 10, a high intensity lamp such as an 250-watt lamp or so is used as the exposure lamp 10 for image forming. Therefore, a great amount of heat is generated as shown in FIG. 4 (C), especially in the case of continuous copying. As described above, exhaust fan 16 is equipped with inlet port 18 on the optical system side to exhaust heated air together with toner. However, such means is not capable of cooling sufficiently. In the past, therefore, cooling fan 23 has been started operating concurrently with the start of copying operation for preventing the temperature rise.

As the copy quantity increases, the temperature on an optical system, namely on exposure lamp 10 primarily and on platen glass 8 and V-shaped mirrors 13 and 14 affected by the travel of the exposure lamp 10 rises sharply as shown by curve A in FIG. 4, and it is saturated at about 70° C. This saturated value is brought about by both radiation of heat on the platen glass 8 and on units in the copying apparatus 7 made by the open air and other radiation of heat by the exhaust fan 16 that is running constantly. The most popular copy quantity is 5 or 6, and its high value is 10 to 20 at the most. Even in that case, the temperature rise is not so high.

However, continuous copying for 6 copies or more causes the temperature of the platen glass 8 to continue rising. In the invention, therefore, when copies are made in succession after the copy button 38 for the start of copying is pressed and thereby the copying apparatus 7 starts copying, CPU 43 and drive control unit 42 indicate the copy quantity on display 42a after each copying. On the other hand, when copying for 6 copies or more continuously, operation of the cooling fan 23 is started by the program inputted in CPU 43 for cooling the platen glass 8. For example, it is possible to cool the platen glass 8 as shown by curve B in FIG. 4 (C). When magnification is applied on document D in this case, namely, when magnification button 41 is operated for enlargement of a small-sized B5 document, for example, the moving speed of the exposure lamp 10 is reduced, resulting in an increase of generated heat per unit area. In addition, in the case of B5 size, the exposure lamp 10 is caused to reverse its course by the signal of sheet size through sheet size button 40 and drive control unit 42 as well as CPU 43, as stated above. In the case of multiple copies (6 copies or more), therefore, the exposure lamp 10 travels at slow speed for a short distance, and heat radiated from the platen glass 8 is great accordingly. In this case, CPU 43 sends signals for increasing wind speed to wind speed switching circuit 51 to increase the speed of revolution of the cooling fan 23. In the case of reduction copying for a large-sized A3 document, on the contrary, the exposure lamp 10 travels at high speed, illuminating time is short, and the time required for the exposure lamp 10 to return is long because of the large-sized document. Therefore, an amount of heat is not so increased. The above explanation is for increase and decrease of heat radiated from the exposure lamp 10 affected by the copy quantity and magnification. However, voltage and current of the power supply for the copying apparatus 7, for example, may further vary depending on the country or the region, and an amount of emitted light (an amount of emitted heat) from the exposure lamp 10 may naturally vary depending upon supply voltage and current. Since this varied amount is received by CPU 43, the speed of revolution of the cooling fan 23 is controlled by the combination of the aforementioned supply voltage, current, copy quantity, sheet size and magnification so that high temperature of the platen glass 8 may be prevented. Further, when a copying operation is resumed immediately after cooling with the cooling fan 23, for example, the temperature of the platen glass 8 is still higher than the normal temperature of 20° C. Therefore, when an amount of heat generated in a short period of time is large as stated above, the cooling fan 23 is changed to blow a strong wind to lower the temperature as shown by curve C in FIG. 4 (C), or the amount of generated heat is reduced by switching magnification or sheet size. After the temperature has been lowered or the amount of generated heat has been reduced, the cooling fan 23 is switched to blow a wind that is milder than the strong wind.

The exposure lamp 10 is adjusted after obtaining the sensitivity of a photoreceptor drum and the converging efficiency of an optical system, and this adjusted amount of light of the exposure lamp 10 is also stored in CPU 43. Under such conditions, an amount of heating by means of the exposure lamp 10 affected by the aforementioned copy quantity, magnification and sheet size is measured experimentally, and the cooling fan 23 is controlled to rotate based on the amount of heating estimated by the measured value mentioned above in the program. Information programmed as stated above is inputted from CPU 43 into the wind speed switching circuit 51, thus the cooling fan 23 can be adjusted in terms of its wind speed between a strong wind and a breeze depending upon the increase or decrease of an amount of heating.

Information of copy quantity, magnification and sheet size are totally subjected to processing in CPU 43, and the strength of wind blown from cooling fan 23 can be switched depending on subtle changes of an amount of heating, thus the platen glass 8 and the exposure lamp 10 in particular can efficiently be cooled after completion of a copy operation.

As stated in detail above, platen glass 8, exposure lamp 10, first reflection mirror 11 and V-shaped mirrors 13 and 14 all of which are provided in copying apparatus 7 are cooled most efficiently through the operation of a timer during the course in which the exposure lamp 10 is lit in the invention. Owing to the foregoing, spraying of toner floating in the copying apparatus 7 and airborne dust can be limited to the minimum, and the platen glass 8, first reflection mirror and V-shaped mirrors 13 and 14 in particular are free of toner and dust for a long period of time, requiring no cleaning work and preventing deterioration of image quality caused by contamination with toner.

Further, the rotation of cooling fan 23 that cools platen glass 8 is totally determined after receiving all conditions for copying in copying apparatus 7 such as copy quantity, sheet size, magnification and an amount of light emitted from an exposure lamp (supply voltage, current), and only when conditions of high temperature are received, is the cooling fan 23 rotated at high speed, while when the temperature is lower than the predetermined one, the cooling fan 23 is either suspended or rotated at low speed. Therefore, it is possible to prevent toner from sticking to the aforementioned exposure section of an optical system by either shortening sharply the operation time of the cooling fan 23 or reducing sharply the wind speed, which is advantageous.

What is claimed is:

1. A copying apparatus comprising:
   (a) a platen, provided on the upper part of said apparatus, on which a document to be copied is placed;
   (b) an exposure means provided below said platen, for illuminating the document, said exposure means moving in parallel with said platen;
   (c) a plurality of reflectors for illuminating an image carrier, moving concurrently with movement of said exposure means;
   (d) means for cooling said platen, provided laterally to the moving paths of said exposure means and said plurality of reflectors; and
   (e) control means for controlling said cooling means to drive after a preset period of time has elapsed since the start of a copying operation.

2. The copying apparatus of claim 1, further comprising a timer connected to said control means for determining the preset period of time.

3. The copying apparatus of claim 1, wherein the preset period of time is controlled based on the number of copies to be made.

4. A copying apparatus comprising:
   (a) a platen, provided on the upper part of said apparatus, on which a document to be copied is placed;
   (b) an exposure means provided below said platen, for illuminating the document, said exposure means moving in parallel with said platen;
   (c) a plurality of reflectors for illuminating an image carrier, moving concurrently with movement of said exposure means;
   (d) means for cooling said platen, provided laterally to the moving paths of said exposure means and said plurality of reflectors;
   (e) means for setting copy quantity to be made;
   (f) means for driving said cooling means; and
   (g) control means for controlling said driving means in accordance with the copy quantity set by said setting means.

5. The copying apparatus of claim 4, wherein said control means controls said driving means in accordance with the size of a document.

6. The copying apparatus of claim 4, wherein said control means controls said driving means in accordance with an image magnification of a document.

7. A copying apparatus comprising:
   (a) a platen, provided on the upper part of said apparatus, on which a document to be copied is placed;
   (b) an exposure means provided below said platen, for illuminating the document, said exposure means moving in parallel with said platen;
   (c) a plurality of reflectors for illuminating an image carrier, moving concurrently with movement of said exposure means;
   (d) means for cooling said platen, provided laterally to the moving paths of said exposure means and said plurality of reflectors;
   (e) an optical system for forming an image of the document illuminated by said exposure means on the surface of said image carrier through said plurality of reflectors;
   (f) means for changing the image magnification of a document by moving said optical system;
   (g) means for selecting a document size;
   (h) means for counting the number of copies made; and
   (i) control means for controlling a drive mode of said cooling means based on at least one of light amount of said exposure means, the number of copies to be made, the selected document size, the changed image magnification and combination thereof when a signal telling a counted number of copies has exceeded a predetermined number of copies is inputted to said control means.

8. The copying apparatus of claim 7, wherein the drive mode of said cooling means is one of a high-speed rotation, a low-speed rotation and inhibition of a rotation.

* * * * *

UNITED STATES PATENT AND TRADEMARK OFFICE
CERTIFICATE OF CORRECTION

PATENT NO. : 5,172,159
DATED : December 15, 1992
INVENTOR(S) : NAKAGAWA et al.

It is certified that error appears in the above-indentified patent and that said Letters Patent is hereby corrected as shown below:

Title page, Item [56], beneath "References Cited", insert:

```
-- "U.S. PATENT DOCUMENTS"
    5,109,253   4/1992    Nakagama et al      355/228
    4,903,072   2/1990    Iwata               355/30
    4,469,432   9/1984    Miyoshi et al       355/30x
    4,303,334  12/1981    Haupt et al         355/30x--.
```

Signed and Sealed this

Twenty-ninth Day of April, 1997

Attest:

BRUCE LEHMAN

*Attesting Officer*   Commissioner of Patents and Trademarks